United States Patent [19]

Raudys et al.

[11] 4,044,450

[45] Aug. 30, 1977

[54] APPARATUS AND METHOD FOR PROVIDING HANGER-CLIP CLOSURES FOR CASINGS

[75] Inventors: Vytas Andrew Raudys; Ronald Robert DeVitto, both of Chicago, Ill.

[73] Assignee: Union Carbide Corporation, New York, N.Y.

[21] Appl. No.: 731,372

[22] Filed: Oct. 12, 1976

[51] Int. Cl.² .................... B21D 39/00; B23P 11/00; B23Q 7/10

[52] U.S. Cl. .................................... 29/509; 17/34; 17/44.2; 29/243.57; 29/788; 29/816; 53/14; 53/138 R; 93/8 WA; 93/35 H

[58] Field of Search .............. 29/509, 243.57, 816, 29/788; 93/8 WA, 35 H, 88; 53/14, 138 R; 17/34, 44.2

[56] References Cited

U.S. PATENT DOCUMENTS

| 2,265,277 | 12/1941 | Gerke | 20/243.57 |
| 2,879,512 | 3/1959 | Tipper | 29/243.57 X |
| 3,266,138 | 8/1966 | Tipper | 29/243.57 X |
| 3,327,514 | 6/1967 | Tipper | 29/243.57 X |
| 3,381,359 | 5/1968 | Schroeder | 29/816 X |
| 3,483,801 | 12/1969 | Kupcikevicius | 93/8 WA |
| 3,565,640 | 2/1971 | Dohlmann | 17/44.2 X |

*Primary Examiner*—Charlie T. Moon
*Attorney, Agent, or Firm*—Cornelius F. O'Brien

[57] ABSTRACT

An apparatus and method for securing a tape loop hanger at the gathered end of a stuffed or unstuffed casing using a substantially U-shaped clip. Specifically the U-shaped clip forces a preformed tape loop hanger into contact with a gathered end portion of a casing whereupon the two opposed legs of the clip are deformed to encircle the gathered casing and the tape loop hanger with sufficient pressure so as to crimp and anchor the tape loop hanger between the legs of the clip so as to secure the tape loop hanger to the gathered end of the casing.

12 Claims, 12 Drawing Figures

APPARATUS AND METHOD FOR PROVIDING HANGER-CLIP CLOSURES FOR CASINGS

FIELD OF THE INVENTION

The invention relates to an apparatus and method for securing a tape loop hanger at the gathered end of a stuffed or unstuffed casing using a substantially U-shaped clip.

BACKGROUND OF THE PRIOR ART

Food casings of the type that can be used in accordance with this invention are usually stuffed with such food items by the use of mechanical equipment. A first end of the food casing is closed and the open or second end is placed over a horn or outlet means from which the food item is ejected under pressure until the food casing is stuffed. The closed end of the food casing must, therefore, be strong enough to withstand the stuffing pressure and also be sufficiently secured so that no food will escape therefrom during stuffing. The second end of the thusly stuffed food casing is then closed and the encased food product further processed in conventional apparatus, such as cooking ovens, smoke houses and the like, where the stuffed food product is cooked and cured and then stored until ready for use or further processing. In general, one end closure of the casing is provided with a looped hanger, such as stout twine, to suspend the stuffed food casing thereby during the processing and storage period. The looped hanger is usually made as an integral part of the first end casing closure.

In present manufacturing methods, these lengths of cured and cooked food products, which can be over 5 feet in length and weigh more than 40 pounds, are then cut transversely into slices of equal thickness and weight, either before or after removing the food casing therefrom, and are then packaged and sold through retail outlets in today's commercial market places.

In accordance with conventional practice, the first end closure is made on the flattened food casings when they are dry. These food casings are then soaked in water before being stuffed in order to render them more pliable during stuffing. The methods presently employed to close one end of a food casing and provide a hanger loop for said closed end use string, twine, cup-clips and the like as is disclosed in U.S. Pat. Nos. 2,462,957, 2,760,226, 3,565,640, 3,575,339 and 3,943,606. During the soaking of those food casings provided with loops of string or twine, the loops often become knotted and tangled and must be manually unraveled before the casing is stuffed or, in any event, before the stuffed food casing is suspended for subsequent processing, curing and cooking.

Since industry is now tending to demand longer and heavier encased food products, attachment of a suitable suspension means to these food casings is becoming increasingly more important. Obviously, suspension means which tend to damage the casing wall so that the casing breaks or suspension means which break or become separated from the encased food products during handling and processing results in waste.

U.S. Pat. No. 3,483,801 discloses an apparatus and method for producing a loop hanger closure for an unstuffed casing, said loop hanger having free ends positioned adjacent to a pleated end of the casing and being secured to said pleated end by a resilient wire clip. The free ends of the hanger loop have beads thereon which coact with the resilient wire clip to form an anchoring means for the hanger loop by which the casing can be suspended. Although this type of casing closure provides an effective loop hanger for casings, it has the disadvantage in that the free ends of the hanger loop have to terminate in beads, nubs, knobs, or the like.

U.S. Pat. Nos. 3,214,883, 3,237,290, 3,279,033, 3,368,322 and 3,455,010 all disclose apparatus for closing and tying bags using wire straps or clips.

In U.S. application Ser. No. 706,353, filed on July 19, 1976 and assigned to the same assignee as the subject invention, a stuffed casing is disclosed having a combination end closure and tape loop hanger of the kind that can be produced using the apparatus and method of this invention.

An object of the present invention is to provide an apparatus for sealing a casing with a combination end closure and loop hanger that is economical to make and which is capable of supporting a product within said casing for an extended period of time as, for example, during subsequent processing and handling.

Another object of the present invention is to provide an apparatus that is adaptable for coupling to conventional clipping devices so that together they will be able to effectively secure a loop hanger to the end of a casing using a clip.

Another object of the present invention is to provide an apparatus and method for securing a tape loop hanger at the gathered end of a stuffed or unstuffed casing using a substantially U-shaped clip.

SUMMARY OF THE INVENTION

The invention broadly relates to an apparatus for securing a tape loop hanger at the gathered end portion of a casing using a substantially U-shaped clip member comprising:

a. means for continuously and successively supplying a predetermined length of tape from a supply source;

b. means for forming a loop hanger from each of said predetermined lengths of tape and supporting each of said tape loop hangers so formed in relative alignment with a gathered end portion of a casing;

c. means for continuously and successively supplying a substantially U-shaped clip in relative alignment with the tape loop hanger and the gathered end portion of the casing, said clip comprising a pair of opposed legs and a crown connecting said corresponding end of said legs; and d. means for advancing and projecting said clip onto and about said tape loop hanger and then onto and about said gathered end portion of the casing followed by deforming the legs of said clip to encircle said tape loop hanger and said gathered end portion of the casing so that said tape loop hanger is secured to the gathered end of said casing by said clip.

In the above apparatus, the tape loop hanger could be supported in an upstanding position on its side edges and the U-shaped clip could be advanced with its legs parallel to the width of said tape loop hanger such that upon contacting the tape loop hanger, the advancing clip will force the upstanding tape loop hanger to rotate into substantial parallel relationship with the crown. The deforming of the legs of the clip to encircle the tape loop hanger and the gathered end portion of a casing will effectively crimp and anchor the tape loop hanger between the clip legs while also securing said tape loop hanger to the gathered end of the casing.

In another embodiment of the apparatus, the tape loop hanger having two extended free ends could be supported on spaced-apart supporting blocks such that when the projecting means forces the clip to contact and project the tape loop hanger between the supporting blocks, the free ends and the loop segment of the loop hanger will be bent in a U-shaped configuration such that when the tape loop hanger is positioned against and secured to the gathered end of the casing by the clip, the extended free ends will curl radially outwardly from the surface of the casing thereby preventing the corners of the free ends from contacting, puncturing or otherwise damaging the casing.

The invention also relates to a method for securing a tape loop hanger at the gathered end of a casing using a substantially U-shaped clip comprising the steps of:

a. gathering an end portion of a casing;

b. forming a loop hanger having two extended free ends from a predetermined length of tape and positioning said tape loop hanger in substantial alignment with said gathered end portion of said casing;

c. advancing a substantially U-shaped clip having a crown member connecting corresponding ends of two opposed legs into contact with said tape loop hanger so as to initially position said tape loop hanger adjacent the crown member between the legs of said clip;

d. advancing the clip and tape loop hanger into contact with the gathered end portion of said casing; and e. deforming the legs of said clip to encircle the tape loop hanger and the gathered end portion of the casing so as to secure said tape loop hanger to the gathered end portion of the casing.

Another method of this invention for securing a tape loop hanger at the gathered end of a casing using a substantially U-shaped clip comprises the steps of:

a. gathering an end portion of a casing:

b. forming an upstanding loop hanger having two extended free ends from a predetermined length of tape and positioning said upstanding tape loop hanger in substantial alignment with said gathered end portion of said casing;

c. advancing a substantially U-shaped clip having a crown member connection corresponding ends of two opposed legs into contact with the upstanding tape loop hanger such that the crown of the clip contacts the edge of the upstanding tape loop hanger and forces it to rotate into substantial parallel alignment with said crown where the tape loop hanger having a width larger than the length of the crown becomes initially crimped thereat;

d. advancing the clip and tape loop hanger into contact with the gathered end portion of said casing; and e. deforming the legs of said clip to encircle the tape loop hanger and the gathered end portion of the casing so as to secure said tape loop hanger to the gathered end portion of the casing.

In both of the above methods the advancing step d) could be modified so that as the clip and tape loop hanger are being advanced into position with the gathered end portion of the casing, the tape loop hanger could be formed into a substantially U-shaped configuration so that when it is positioned adjacent with and secured to the gathered end portion of the casing, the free ends of the tape will curl radially outwardly from the surface of the casing thereby preventing the corners of the free ends from contacting, puncturing or otherwise damaging the casing.

The loop hanger of this invention could be made of a deformable flexible type material wider than the inside crown of a preformed U-shaped clip. Preferably, the apparatus functions such that the tape is first preformed with an open loop having two extended free ends and then bent so that when positioned adjacent an end portion of a gathered casing, the free ends will curl outwardly from the gathered casing end at the point where a U-shaped clip can be fastened. The legs of the clip can then be automatically deformed into encircling pressure engagement about the gathered casing end and the free ends of the tape loop hanger with a sufficiently high radially inwardly directed compressive force to produce a leak-free closure thereat. Since the width of the tape is preferably wider than the inside length of the crown of the clip, then the free ends of the tape can be crimped between the legs of the clip thereby firmly anchoring the tape to the gathered end of the casing via said clip. In addition, the apparatus can be made such that the extended free ends of the tape hanger can be made to curl radially outward away from the casing surface so as not to puncture or otherwise damage the casing. The wide open loop of the tape closure so formed by the apparatus of this invention can be readily manipulated onto hanging means for processing; is readily adjustable to conform to the hanging means; distributes the weight of the product to the gathered casing end; maintains holding power throughout a wide temperature range; and when the casing contains food, such as bologna, salami and the like, it prevents pronating of the stuffed casing during processing.

The term "casing" as employed throughout this application and in the appended claims is intended to include, but not be restrictive of, those tubular food casings fabricated from such materials as collagen, cellulose, regenerated cellulose, cellulose having fibers embedded therein, polyvinyl chloride, polypropylene, polyethylene, polyvinylidene chloride, and the like. These food casings are also known by those skilled in the art as "sausage casings" and are generally employed as containers or molds into which is stuffed or encased a food item, such as raw meat emulsions, meat chunks, discrete meat cuts, and the like. These encased food items can then be frozen or, if desired, processed, as by cooking and curing, and items such as salami and bologna sausages, spiced meat loaves, ham loaves, hams and the like, can be obtained.

In addition, the term "casing" is intended to include, but not be restrictive of, flexible bags fabricated from such materials as cloth, plastics, netting or the like or two or more of these flexible materials which are suitable for gathering together to form a neck-like extension onto which the tape loop hanger can be secured. For example, an article may be packaged in a plastic bag and then placed in a netting which could be gathered at the open end to form an extended neck onto which the tape loop hanger could be secured in accordance with this invention.

The material of the tape loop hanger could be selected from such materials as metal tape, filament tape, plastic tape such as polyester, polypropylene, nylon or the like.

The material employed to form the clip is not critical and can be selected from such materials as aluminum, plastics, steel, metallic alloys and the like, provided the materials are capable of being suitably formed into and function in a manner similar to that described herein. Similarly, the cross-sectional configuration of the clip wires employed is also not critical and clip wires having circular, oval, U-shaped, triangular, square or rectangular cross sections and the like can be readily employed.

Preferably the width of the tape for use in the apparatus should be wider than the internal length of the crown of the clip so that when the legs of the clip are deformed to encircle the tape and the gathered section of a casing, the legs will forcibly squeeze and crimp the tape into a secured anchored engagement. To provide a sufficient crimping of the tape between the legs of the clip, the width of the tape should be about 5 to 25% wider than the internal length of the crown of the clip and for most applications could be about 10% wider. By adjusting the degree of crimping of the tape within the clip, the loop hanger of this invention could sustain weights up to and above 50 pounds.

DETAILED DESCRIPTION

Figure 1:
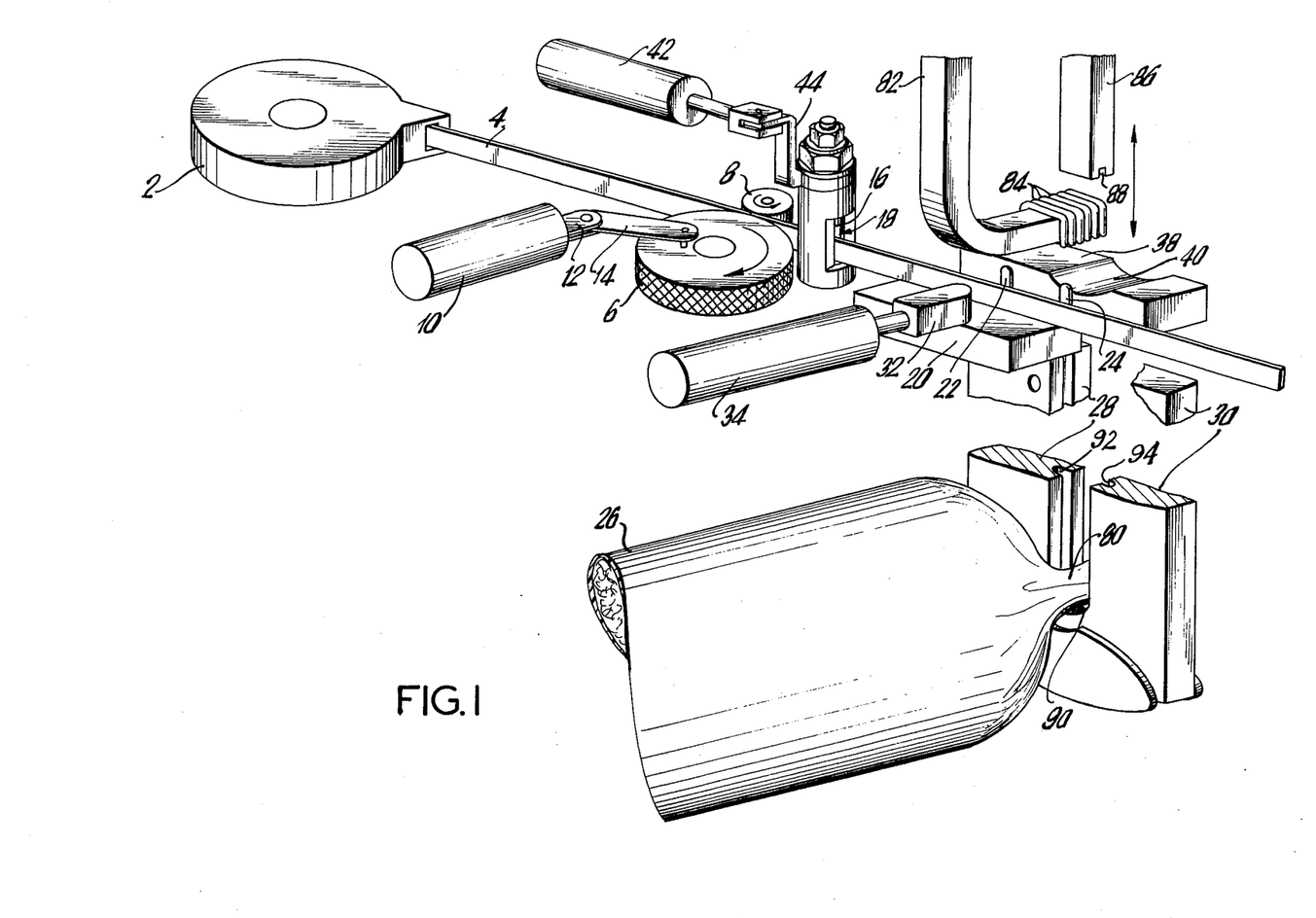
FIG. 1 is a schematic perspective view of one embodiment of the apparatus of this invention shown with a strip of tape supplied and fed through the apparatus.

In FIG. 1 there is shown one embodiment of the apparatus of this invention in which reference number 2 denotes a supply source from which is unwound an inventory of semi-rigid tape 4, suitable for forming a loop hanger as will be described below. Initially, the leading edge of the tape 4 is advanced and positioned between tape feed gripper roll 6 and tape feed compression roll 8 and into the rotary knife 46 whereupon the apparatus is ready for operation. Actuation and inactuation of air cylinder 10 by conventional means (not shown) advances and retracts, respectively, piston 12 coupled to slider crank 14 which rotates tape feed gripper roll 6 one complete revolution. The rotation of gripper roll 6 causes tape 4 to feed through an aperture 16 of guide member 18 (see FIG. 6) whereupon the tape is advanced on support block 20 such that the approximate midpoint or an off-center portion of the tape between the end of tape 4 and the exit of aperture 16 of guide member 18 is juxtaposed tape loop-forming pins 22–24. Disposed below the extended tape 4 is a stuffed casing 26 which has its unfilled gathered end 80 within pivotable female and male casing gatherer-clip guides 28–30 as found in clip-closure machines, as, for example, the machine disclosed in U.S. Pat. No. 3,717,972 which is incorporated herein by reference.

Figure 2:
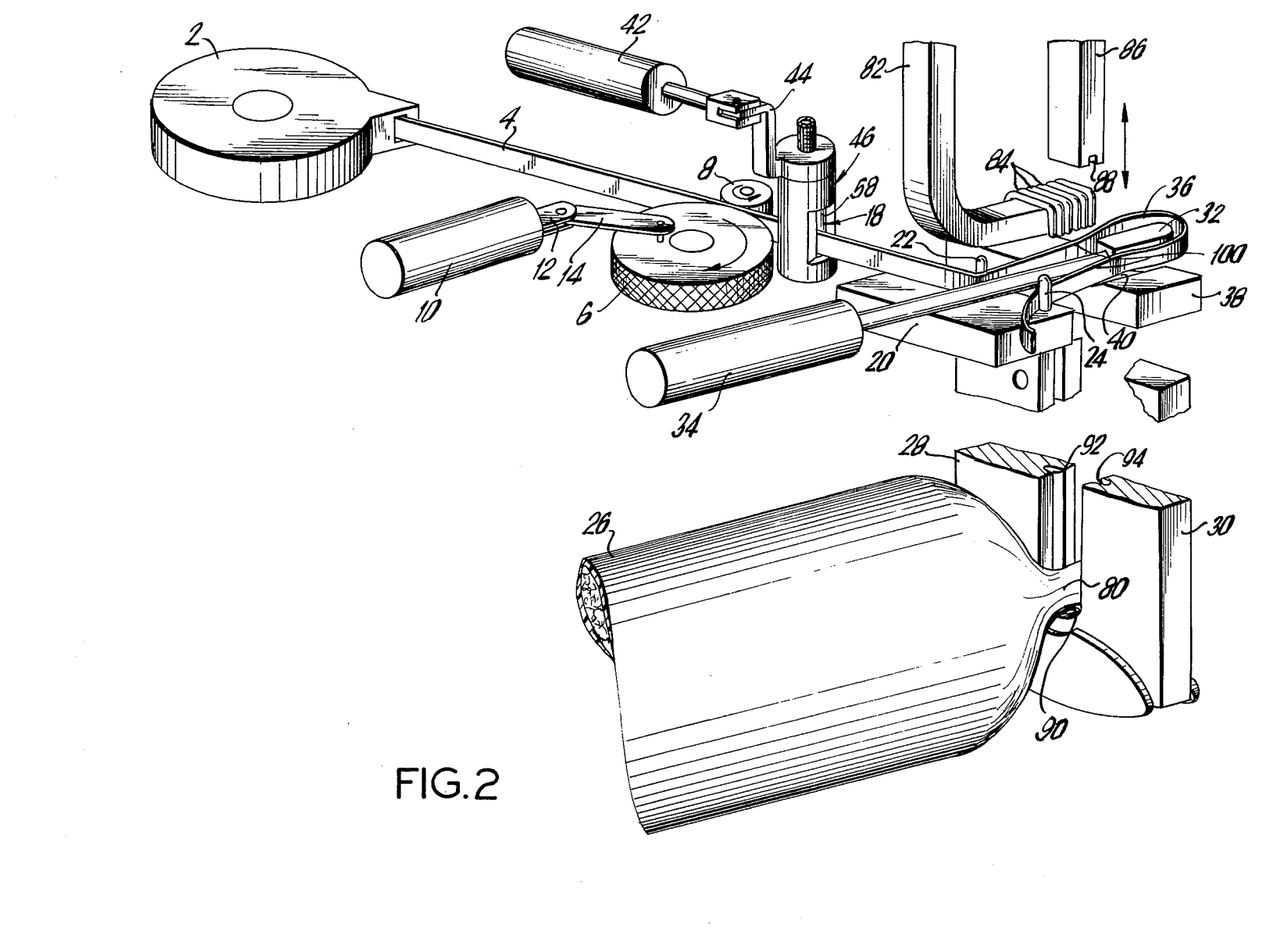
FIG. 2 is a schematic perspective view of the apparatus of FIG. 1 with a segment of the tape formed into a loop hanger.

As shown in FIGS. 1 and 2, when tape 4 is advanced to a desired length through the rotation of tape feed gripper roll 6, a looper plunger 32 is actuated via pneumatic cylinder 34 to contact tape 4 between the loop former pins 22–24 to form a bight or loop 36. The looper plunger 32 is then retracted leaving the tape loop 36 supported on blocks 20 and 38 with block 38 having a slight curved area 40 to facilitate rotation of the tape loop 36 as will be described below.

Figures 6, 7:
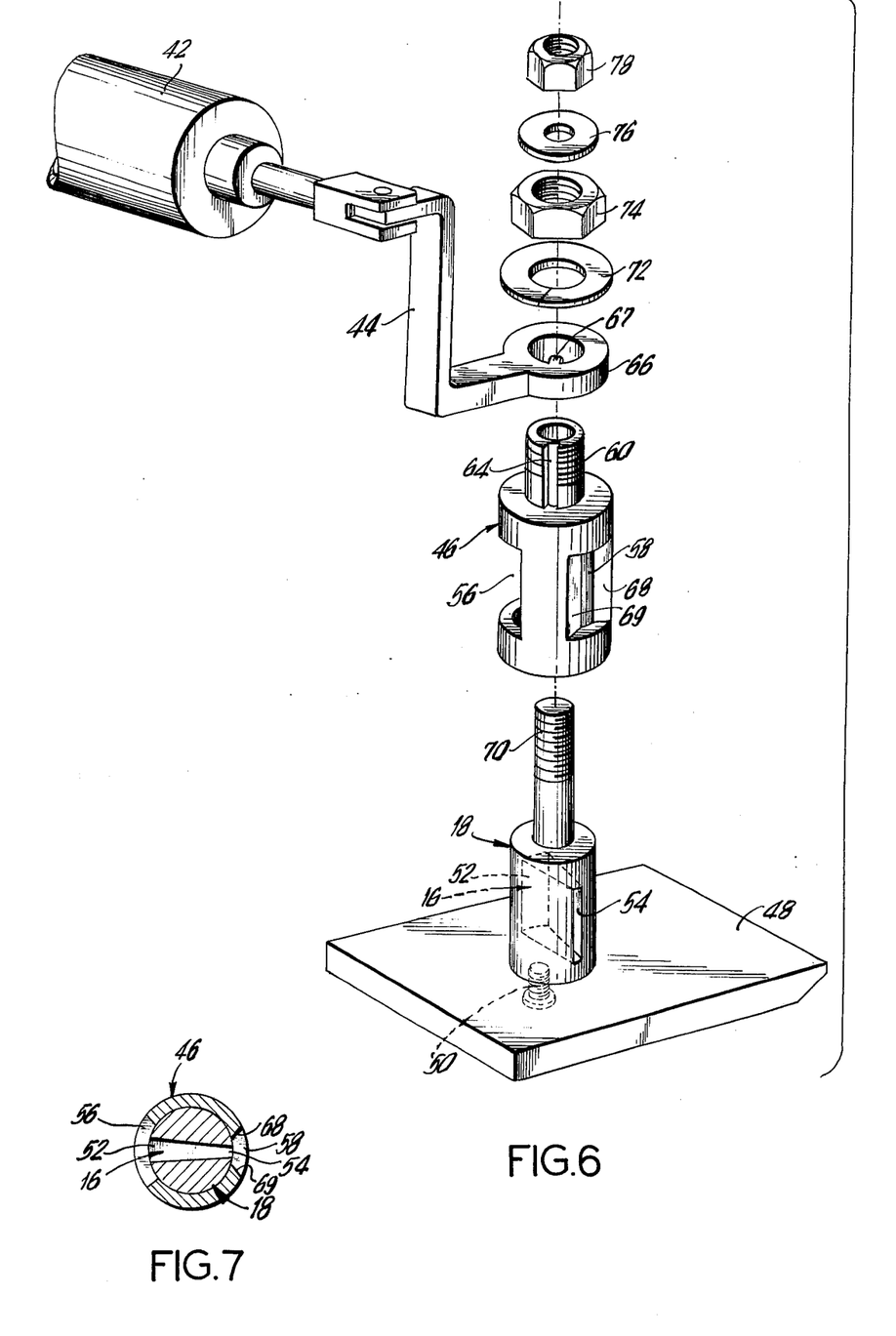
FIG. 6 is an exploded perspective view of the cutting device shown in the apparatus of FIG. 1.
FIG. 7 is a mid-cross sectional view of the cylindrical guide member 18 and rotatable cylindrical knife 46 of FIG. 6 shown in the assembled state as presented in FIGS. 1 to 5.
Figure 8:
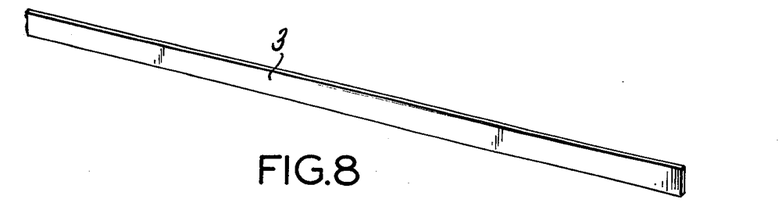
FIGS. 8 through 12 show a sequence of views of a tape being initially folded into a loop and then secured to a gathered end of a casing using a U-shaped clip.
Figure 9:
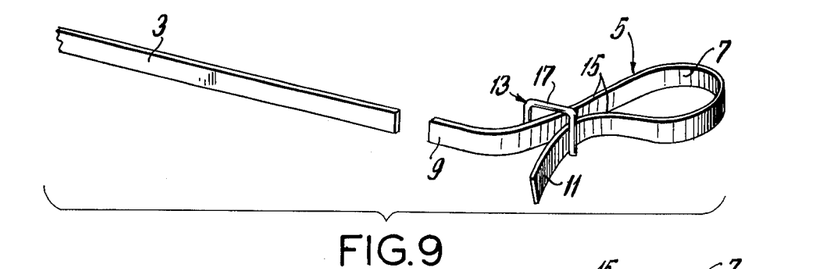
Figure 10:
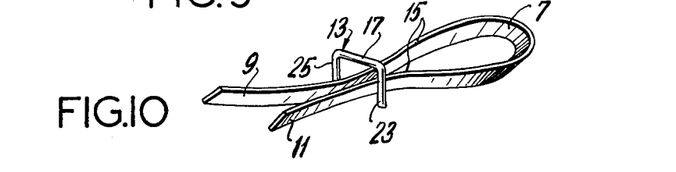

As shown in FIGS. 1 to 3 and 6, after forming tape loop 36, a pneumatic cylinder 42 is actuated which advances linkage 44 which, in turn, rotates rotary knife 46 which is coaxially mounted about guide member 18. The rotary knife unit illustrated in FIG. 6 is a separate invention and is disclosed in a concurrently filed U.S. application Ser. No. 731,632 in the names of the same applicants as the subject invention.

As shown in FIGS. 6 and 7, a cylindrical guide member 18 fixedly supported on base 48 via screw means 50 has an elongated tapered opening 16 for guiding a tape from the wide angle opening 52 out through the narrow angle opening 54. Coaxially mounted about guide member 18 is rotary knife 46 which is in the form of a cylindrical member having elongated slot 56 and blade slot 58 adapted to be aligned with openings 52 and 54, respectively, in guide member 18. Protruding from rotary knife 46 is a threaded member 60 having a slot 64 adapted for sliding within linkage boss 66 extending from linkage 44, said linkage boss 66 having polarized elongated rib 67 for sliding within slot 64. Thus, when rotary knife 46 is slid over guide member 18, and linkage boss 66 is slid over threaded member 60, rotation of linkage boss 66 will rotate knife 46 thereby effecting a cutting action by the blade 68 and/or 69 defining blade slot 58 at the opening 54 of guide member 18 as shown in FIG. 7 which is a cross-sectional view of the guide member 18 and rotary knife 46 after they have been assembled. To secure the rotary knife assembly together, the guide member 18 has a projected threaded member 70 which projects through and above projected threaded member 60 of rotary knife 46 and through and above linkage boss 66. A lock washer 72 is disposed over projected members 60 and 70 and seats on linkage boss 66. Thereafter nut 74 is secured to the threaded area on projection 60 followed by thrust washer 76 and prevailing torque nut 78, the latter of which is threadably secured to the threaded area on projected member 70.

Figure 3:
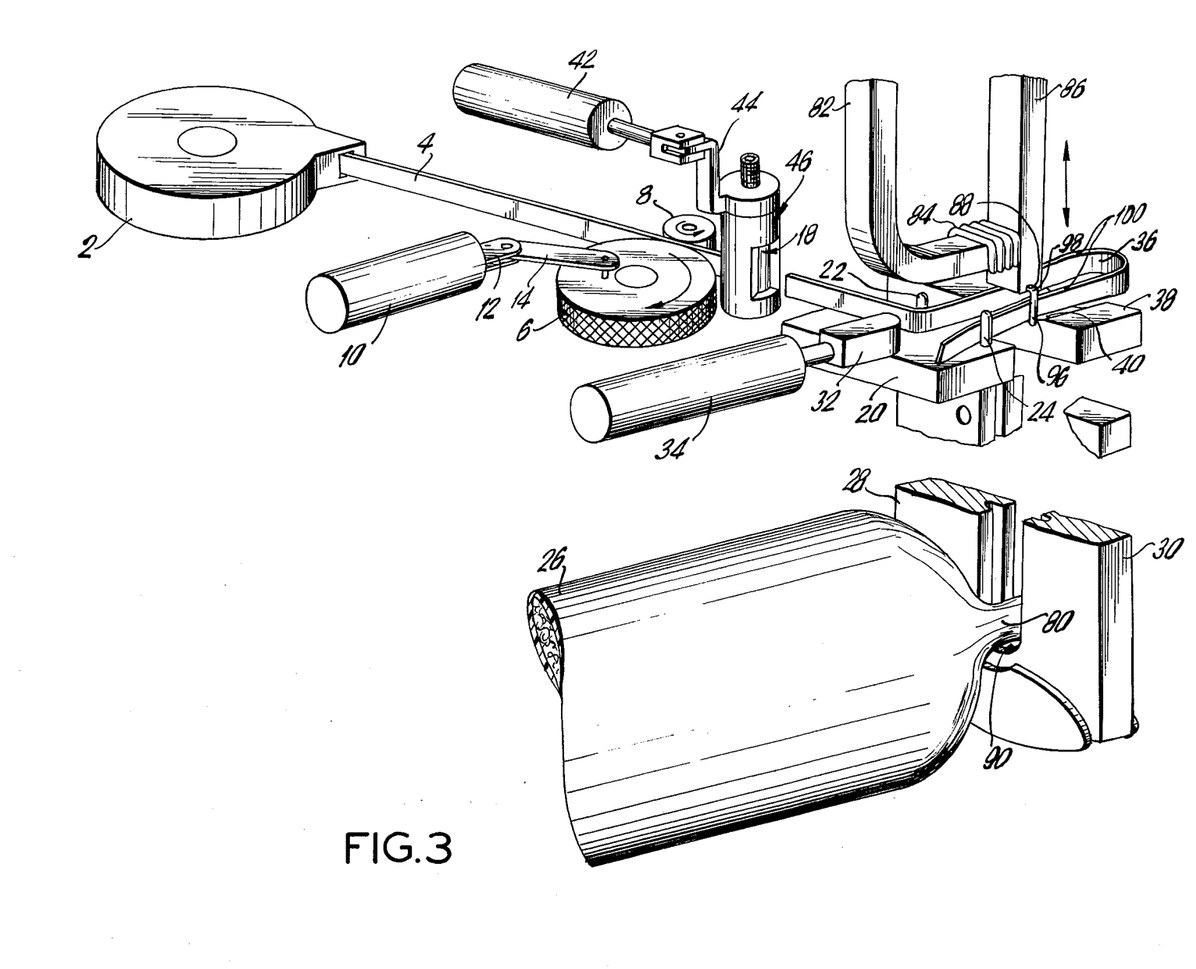
FIG. 3 is a schematic perspective view of the apparatus of FIG. 2 shown after the segment of the tape loop hanger has been cut and a U-shaped clip advanced to contact and initiate rotation of the tape loop hanger.
Figure 4:
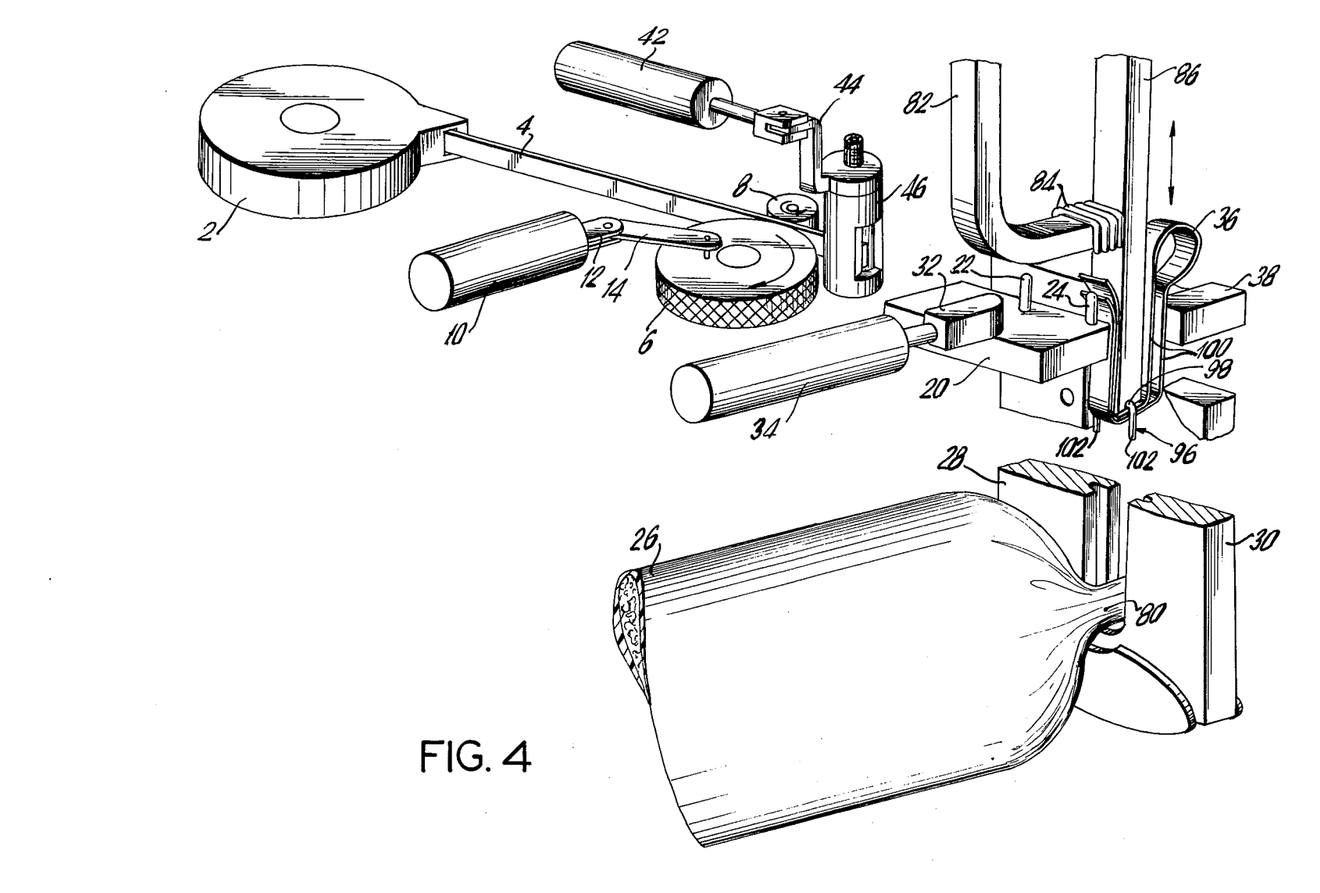
FIG. 4 is a schematic perspective view of the apparatus of FIG. 3 shown with the clip and tape loop hanger being advanced toward the gathered end portion of a casing.
Figure 5:
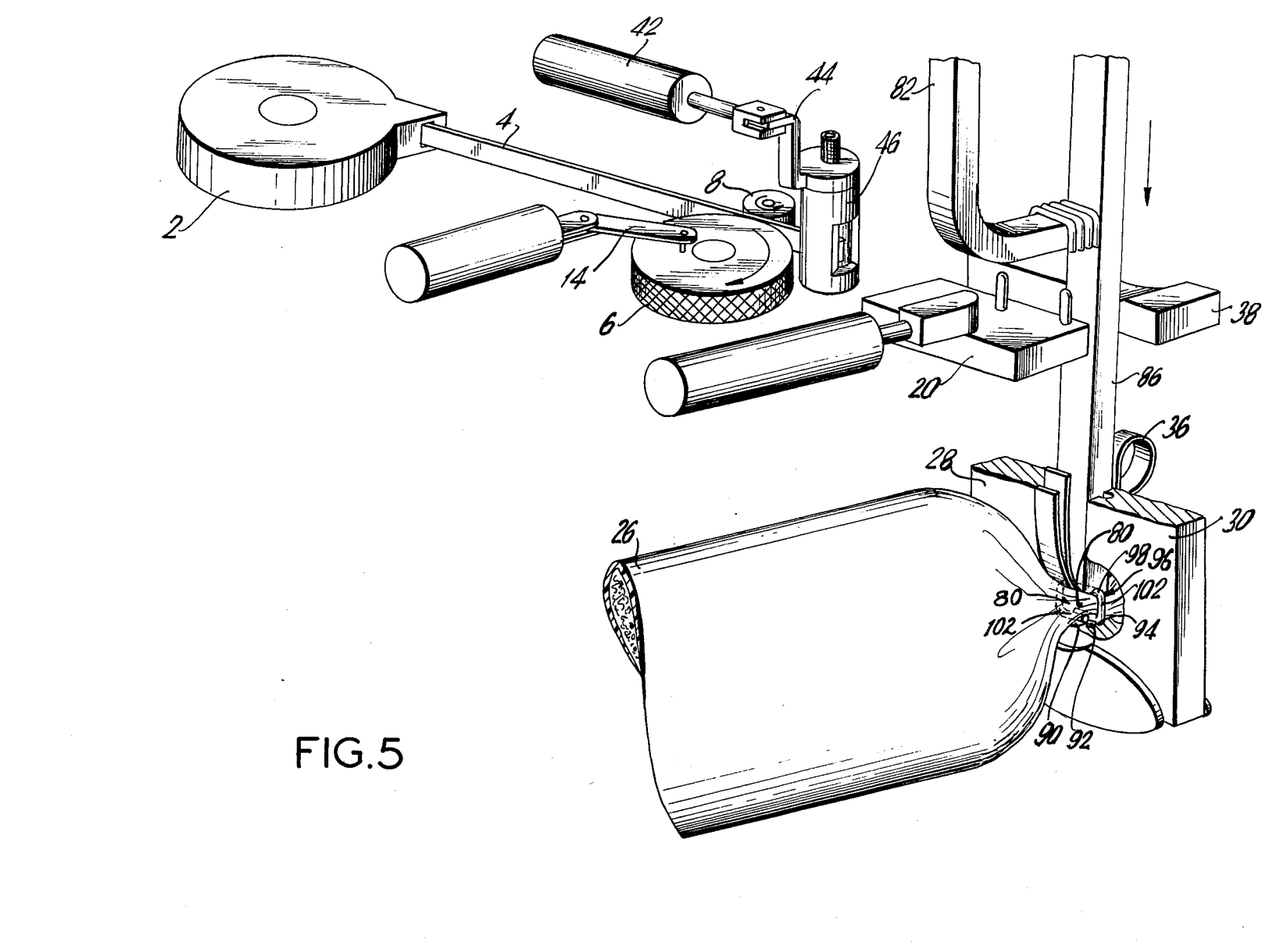
FIG. 5 is a schematic perspective view of the apparatus of FIG. 4 shown with the legs of the U-shaped clips being deformed to encircle the tape loop hanger and gathered end portion of a casing.

As stated above and in conjunction with FIGS. 1 to 6, actuation of pneumatic cylinder 42 will advance linkage 44 which rotates rotary knife 46 thereby severing tape 4 at the opening 54 of guide member 18. Disposed above support blocks 20 and 38 is a conventional clip guide 82 containing a plurality of U-shaped clips 84. Juxtaposed the discharge end of clip guide 82 is a conventional clipper ram 86 having an upper clip die recess 88. Disposed directly below clipper ram 86 is a conventional pivotable female casing gatherer-clip guide 28 and pivotable male casing gatherer-clip guide 30, said male clip guide 30 having a conventional lower die recess 90 in which the legs of the clips 84 can be deformed to encircle the tape loop hanger 36 and the gathered end portion of the casing 80 as shown in FIG. 5. A groove 92-94 is disposed in each of the clip guides 28-30, respectively, for guiding and directing a clip 84 about the gathered end portion 80 of the casing positioned within said clip guide 28-30.

As shown in FIGS. 3 and 4, after the tape loop hanger 36 is severed, clipper ram 86 is advanced via conventional pneumatic cylinder means (not shown) to project a clip 96 about the upstanding tape looper hanger 36 whereupon the crown 98 of clip 96 contacts the edges 100 of the loop hanger 36 and forces the looper hanger 36 to rotate on the curved area 40. As shown in FIG. 4, the looper hanger 36 is rotated to a position where it is aligned substantially parallel with the crown 98 of clip 96. The clip-loop hanger assembly is further advanced between blocks 20 and 38 where the tape loop hanger 36 assumes a substantially U-shaped configuration before being positioned adjacent the gathered end 80 of the casing as shown in FIGS. 4 and 5. As shown in FIG. 5, the legs 102 of the clip 96 are deformed about the gathered end portion 80 of the casing 26 and the tape loop hanger 36 with sufficient pressure to secure said tape loop hanger 36 to the gathered end portion 80 of the casing with a water-tight seal. Once the clip closure is so secured to the casing 80 and hanger 36, clipper ram 86 is retracted and the apparatus is ready to begin the next cycle. It should be understood that conventional timing means could be employed to sequentially operate the different components of the apparatus described above.

Figure 11:
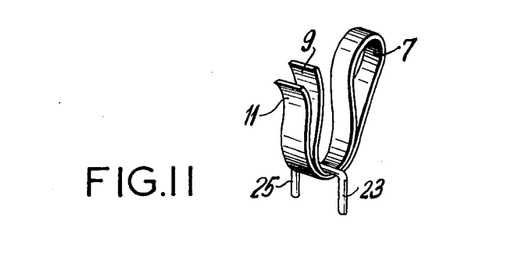
Figure 12:
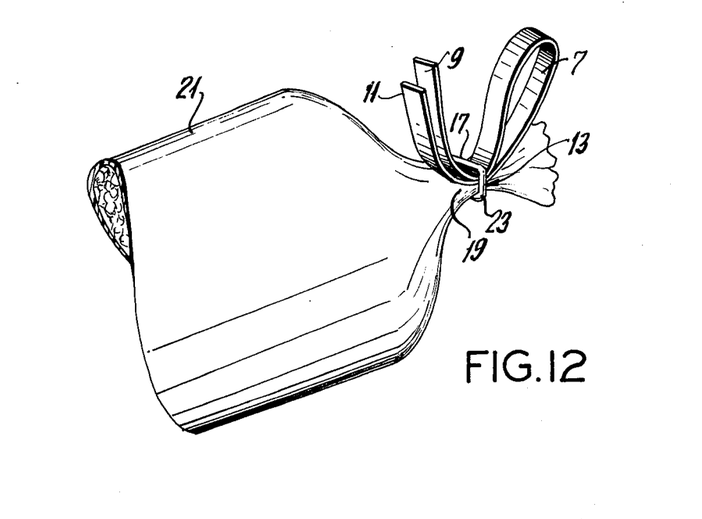

FIGS. 8 through 12 are presented to schematically illustrate the forming of a tape looper hanger and the securing of it to the gathered end portion of a casing. Specifically, a strip of tape 3 is cut to a predetermined length 5 and formed into a loop hanger 7 having extended free ends 9 and 11. With the loop hanger 7 supported in an upright position, a clip 13 is advanced over and about the loop hanger 7 whereupon it contacts the top edges 15 of said loop hanger 7 with a force sufficient to rotate or twist the loop hanger 7 to a position substantially parallel with the crown 17 of clip 13 and then further forces the loop hanger 7 between guide blocks (not shown) so as to bend said loop hanger 7 into a U-shaped configuration as shown in FIG. 11. Thereafter the clip-loop hanger assembly is advanced to the gathered end 19 of the stuffed casing 21 where clip legs 23-25 are deformed about the loop hanger 7 and gathered casing 19 with sufficient force to secure the loop hanger 7 to the gathered casing 19 and to provide a water-tight closure for said casing.

EXAMPLE

Each of several 4.66 inch (11.8 centimeters) diameter casings, clip-closed at one end, was filled with food product and then closed with a hanger-clip closure using the apparatus as shown in FIG. 1. The hanger tape of sanitary flexible plastic was approximately 8 inches (20.3 centimeters) long and preformed to form a loop approximately 2.5 inches (6.4 centimeters) long when flattened and having extended free ends, one of which was approximately 1.125 inches (2.86 centimeters) long and the other 1.25 inches (3.17 centimeters) long. The apparatus deformed the tape as shown in the drawing and then applied a U-shaped wire clip to secure the preformed tape to the gathered end of the casing. Each of the stuffed casings, measuring five feet (152 centimeters) long and weighing about 30 pounds, was then grasped by the loop portion of the tape and positioned in a close spacing arrangement on a rod in a smokehouse where the food product was processed. The processed stuffed casings were then removed and no difficulty was encountered in their handling either prior to processing or subsequent to processing.

It should be understood that the foregoing disclosure relates to preferred embodiments of the invention and it is intended to cover all changes and modifications of the invention which do not depart from the spirit and scope of the appended claims.

What is claimed is:

1. An apparatus for securing a tape loop hanger at the gathered end portion of a casing using a substantially U-shaped clip member comprising:
    a. means for continuously and successively supplying a predetermined length of tape from a supply source;
    b. means for forming a loop hanger in each of said predetermined lengths of tape and supporting each of said tape loop hangers so formed in relative alignment with a gathered end portion of a casing;
    c. means for continuously and successively supplying a substantially U-shaped clip in relative alignment with the tape loop hanger and the gathered end portion of the casing, said clip comprising a pair of opposed legs and a crown connecting the corresponding end of said legs; and
    d. means for first advancing and projecting said clip onto and about said tape loop hanger, and then advancing said clip and said tape loop hanger into contact with said gathered end portion of the casing and thereafter deforming the legs of said clip to encircle said tape loop hanger and said gathered end portion of the casing so that said tape looper hanger is secured to the gathered end of said casing.

2. The apparatus of claim 1 wherein the tape loop hanger is supported in an upstanding position on its side edges and the means in (d) advances the substantially U-shaped clip with its legs parallel to the width of said tape loop hanger so that the clip will contact and force the upstanding tape loop hanger to rotate into substantial parallel relationship with the crown of the clip and then deforms the legs of the clip to encircle the tape loop hanger and the gathered end portion of the casing with sufficient force to crimp and anchor the tape loop hanger between the clip legs while also securing said tape loop hanger to the gathered end of the casing.

3. In the apparatus of claim 1 wherein the means in (b) forms a loop hanger having a loop segment terminating with two free ends and wherein means are added for supporting the tape loop hanger on two spaced-apart supporting blocks such that when the means of step (d) are advanced to project said clip onto and about said tape loop hanger and said gathered end portion of the casing, the loop segment and the free ends of the tape loop hanger will be bent within the space defined by said spaced-apart blocks into a substantially U-shaped configuration so that when said tape loop hanger is secured to the gathered end portion of the casing, the free ends of the tape loop hanger will curl radially outwardly from the surface of the casing.

4. The apparatus of claim 2 wherein the means in (b) forms a loop hanger having a loop segment terminating with two free ends and wherein means are added for supporting the tape loop hanger on two spaced-apart supporting blocks such that when the means of step (d) are advanced to project said clip onto and about said tape loop hanger and said gathered end portion of the casing, the loop segment and the free ends of the tape loop hanger will be bent within the space defined by said spaced-apart blocks into a substantially U-shaped configuration so that when said tape loop hanger is secured to the gathered end portion of the casing, the free ends of the tape loop hanger will curl radially outwardly from the surface of the casing.

5. The apparatus of claim 1 wherein the means for forming a loop hanger in each predetermined length of tape is a pneumatic cylinder-operated plunger which extends and retracts between two spaced-apart tape loop-former pins such that when a length of tape is juxtaposed said pins in an upstanding position and the plunger is advanced between said pins, the plunger will force the tape between said pins whereupon the tape will assume a loop configuration.

6. The apparatus of claim 2 wherein the means for forming a loop hanger in each predetermined length of tape is a pneumatic cylinder-operated plunger which extends and retracts between two spaced-apart tape loop-former pins such that when a length of tape is juxtaposed said pins in an upstanding position and the plunger is advanced between said pins, the plunger will force the tape between said pins whereupon the tape will assume a loop configuration.

7. The apparatus of claim 3 wherein the means for forming a loop hanger in each predetermined length of tape is a pneumatic cylinder-operated plunger which extends and retracts between two spaced-apart taped loop-former pins such that when a length of tape is juxtaposed said pins in an upstanding position and the plunger is advanced between said pins, the plunger will force the tape between said pins whereupon the tape will assume a loop configuration.

8. The apparatus of claim 4 wherein the means for forming a loop hanger in each predetermined length of tape is a pneumatic cylinder-operated plunger which extends and retracts between two spaced-apart tape loop-former pins such that when a length of tape is juxtaposed said pins in an upstanding position and the plunger is advanced between said pins, the plunger will force the tape between said pins whereupon the tape will assume a loop configuration.

9. A method for securing a tape loop hanger at the gathered end of a casing using a substantially U-shaped clip comprising the steps of:
 a. gathering an end portion of a casing;
 b. forming a loop hanger having two extended free ends from a predetermined length of tape and positioning said tape loop hanger in substantial alignment with said gathered end portion of said casing;
 c. advancing a substantially U-shaped clip having a crown member connecting corresponding ends of two opposed legs into contact with said tape loop hanger so as to initially position said tape loop hanger adjacent the crown member between the legs of said clip;
 d. advancing the clip and tape loop hanger into contact with the gathered end portion of said casing; and
 e. deforming the legs of said clip to encircle the tape loop hanger and the gathered end portion of the casing so as to secure said tape loop hanger to the gathered end portion of the casing via said clip.

10. The method of claim 9 wherein prior to step (d) the following step is added:
 c'. forming the tape loop hanger into a substantially U-shaped configuration such that the free ends of the tape form one leg of the U-shaped configuration and the loop forms the other leg of the U-shaped configuration.

11. A method for securing a tape loop hanger at the gathered end of a casing using a substantially U-shaped clip comprising the steps of:
 a. gathering an end portion of a casing;
 b. forming an upstanding loop hanger having two extended free ends from a predetermined length of tape and positioning said upstanding tape loop hanger in substantial alignment with said gathered end portion of said casing;
 c. advancing a substantially U-shaped clip having a crown member connecting corresponding ends of two opposed legs into contact with the upstanding tape loop hanger such that the crown of the clip contacts the edge of the upstanding tape loop hanger and forces it to rotate into substantial parallel alignment with said crown where the tape loop hanger having a width larger than the length of the crown becomes initially crimped thereat;
 d. advancing the clip and tape loop hanger into contact with the gathered end portion of said casing; and
 e. deforming the legs of said clip to encircle the tape loop hanger and the gathered end portion of the casing so as to secure said tape loop hanger to the gathered end portion of the casing.

12. The method of claim 11 wherein prior to step (d) the following step is added:
 c'. forming the tape loop hanger into a substantially U-shaped configuration such that the free ends of the tape form one leg of the U-shaped configuration and the loop forms the other leg of the U-shaped configuration.

* * * * *